United States Patent [19]

Demedash

[11] Patent Number: 5,797,643
[45] Date of Patent: Aug. 25, 1998

[54] FASTENING A FABRIC COVER TO A VEHICLE SURFACE

[75] Inventor: Lloyd Demedash, Lockport, Canada

[73] Assignee: FIA Inc., Winnipeg, Canada

[21] Appl. No.: 588,855

[22] Filed: Jan. 19, 1996

[51] Int. Cl.$^6$ ............................................ B60P 7/04
[52] U.S. Cl. ............... 296/100; 180/68.6; 24/462; 24/573.1; 24/DIG. 11; 160/368.1; 160/DIG. 1
[58] Field of Search .................. 296/100, 91, 95.1; 24/578, 304, 573.1, 693, DIG. 11, 459, 462; 160/327, 354, 368.1, 399, 402, DIG. 1; 180/68.6

[56] References Cited

U.S. PATENT DOCUMENTS

| | | | |
|---|---|---|---|
| 1,451,612 | 4/1923 | Hausner | 24/DIG. 11 |
| 1,904,122 | 4/1933 | Chapman | 24/573.1 |
| 2,944,601 | 7/1960 | Compson | 296/95.1 |
| 3,206,818 | 9/1965 | Knowlton | 24/693 |
| 3,659,319 | 5/1972 | Erickson | 24/304 |
| 4,236,592 | 12/1980 | Ziegler | 296/91 X |
| 4,523,657 | 6/1985 | Kooyumjian | 160/DIG. 1 X |
| 4,526,416 | 7/1985 | Rode | 296/100 |
| 4,776,627 | 10/1988 | Hutto et al. | 180/68.6 X |
| 5,441,095 | 8/1995 | Trethewey | 24/304 X |
| 5,520,031 | 5/1996 | Davidge | 24/304 X |

Primary Examiner—Dennis H. Pedder
Attorney, Agent, or Firm—Adrian D. Battison; Murray E. Thrift

[57] ABSTRACT

A cover for the grill or box of a vehicle is supplied as a kit of parts including a fabric cover with a plurality of female snap fastener elements together with a plurality of first male snap fastener elements and a plurality of second male snap fastener elements. Each of the male snap fastener elements includes a flat rigid disc with a male portion standing upwardly from the disc for insertion into the female portion carried by the cover. The first male portions have an adhesive layer directly on an underside of the disc together with a covering layer which can be removed to apply the disc directly by adhesive to the vehicle surface at the suitable location. The second type of male fasteners includes a coupling member with a flexible sheet having a mushroom-shaped stud projecting from the sheet and coupling to the disc. The sheet carries an adhesive layer with a covering layer thereon. The sheet allows a curvature of attachment to follow the curvature of the vehicle surface so the sheet curves away from the disc in the area underneath the disc.

2 Claims, 3 Drawing Sheets

FASTENING A FABRIC COVER TO A VEHICLE SURFACE

This invention relates to a technique for fastening a fabric cover to surfaces of a vehicle.

BACKGROUND OF THE INVENTION

It is well known to provide fabric covers which engage over the grill of a vehicle. Such covers can be imperforate for acting as a winter front to reduce the amount of cooling air passing through the grill or can constitute a bug screen in which case the fabric cover is formed from a perforated screen material to allow air to flow through while preventing passing of insects and other debris.

It is also well known to provide a cover for the box of a pick-up truck which is known as a tonneau cover.

In many cases these fabric covers are fastened using press fasteners which comprise a female cap member attached to the fabric cover around a peripheral edge portion thereof together with a male stud member which has a peripheral rim extending into the cap member for readily releasable and reengageable snap fastening arrangements. A plurality of such fasteners are arranged at spaced positions around the periphery of the fabric cover. Such arrangements have been manufactured and widely sold for many years.

Up until now the usual technique for attachment of the male stud member to a surface of the vehicle involves drilling a hole in the vehicle surface and using a self-tapping screw engaged through a central hole in the stud member to clamp the stud member to the vehicle surface. This technique has been widely used for many years and is presently sold by a number of manufacturers.

However this technique has a significant disadvantage that the vehicle owner in many cases does not want to perforate the vehicle surface in view of the difficulties which can be caused to the rust and corrosion prevention coatings of the surface. There is a reluctance therefore to purchase covers of this type which require the user to drill holes in the vehicle surface.

One solution which has been provided therefore in regard to the tonneau cover on the truck box is to manufacture a rail system which is initially attached to the vehicle using openings already available in the vehicle following which the tonneau cover is attached to the rails using the conventional press fastener systems. This system however of course requires significant extra parts to be manufactured, transported and assembled for the finished product. However the reluctance of users to perforate the vehicle surface has lead to such complex solutions to this long standing problem.

SUMMARY OF THE INVENTION

It is one aspect of the invention therefore, to provide an improved fastening system for attachment of a cover to a vehicle or similar body.

According to one aspect of the invention there is provided a vehicle comprising; vehicle body having at least one opening therein to be covered; a plurality of vehicle surfaces arranged around said at least one opening; a fabric cover for engaging over the opening and having edge portions for engaging respective ones of the vehicle surfaces; and a plurality of fastening elements for fastening the edge portions to the respective vehicle surfaces; each fastening element comprising a female cap member attached to a respective fabric edge portion; a male stud member having a base portion and a projecting portion with a peripheral rim of the projecting portion standing upwardly from the base portion and engageable into the cap member as a readily releasable and reengageable snap fastener; and a layer of adhesive having one surface adhesively fastened to the base portion and an opposed surface fastened to the respective vehicle surface.

According to a second aspect of the invention there is provided apparatus comprising; body having a portion thereon to be covered; a plurality of body surfaces arranged around said portion; a fabric cover for engaging over the portion and having edge portions for engaging respective ones of the body surfaces; and a plurality of fastening elements for fastening the edge portions to the respective body surfaces; each fastening element comprising a female cap member attached to a respective fabric edge portion; a male stud member having a base portion and a projecting portion with a peripheral rim of the projecting portion standing upwardly from the base portion and engageable into the cap member as a readily releasable and reengageable snap fastener; the base portion comprising a substantially rigid disc rigidly attached to the projecting portion and a flexible attachment member which has a bottom surface which is deformed to follow a curvature of the respective body surface and means fastening the disc to the flexible attachment member; and a layer of adhesive having one surface adhesively fastened to the flexible attachment member and an opposed surface fastened to the respective vehicle surface; wherein the flexible attachment member is attached to the respective body surface such that the flexible attachment member is curved at portions thereof underlying the rigid disc; and wherein the means fastening the disc to the flexible attachment member is arranged to remain fastened when the projecting portion is removed from the cap.

According to a third aspect of the invention there is provided a kit of parts for attachment of a cover to a vehicle comprising; a fabric cover for engaging over a portion of the vehicle and having edge portions for engaging respective ones of the vehicle surfaces; a plurality of fastening elements for fastening the edge portions to the respective vehicle surfaces, each fastening element comprising a female cap member attached to a respective fabric edge portion; a first plurality of male fastening elements, each comprising a male stud member having a base portion and a projecting portion with a peripheral rim of the projecting portion standing upwardly from the base portion and engageable into the cap member as a readily releasable and reengageable snap fastener, the base portion comprising a substantially rigid disc rigidly attached to the projecting portion and a layer of adhesive having one surface adhesively fastened to a bottom surface of the disc and an opposed surface covered by a removable covering layer for fastening to the respective vehicle surface; and a second plurality of male fastening elements, each comprising a male stud member having a base portion and a projecting portion with a peripheral rim of the projecting portion standing upwardly from the base portion and engageable into the cap member as a readily releasable and reengageable snap fastener, the base portion comprising a substantially rigid disc rigidly attached to the projecting portion and a flexible attachment member which has a bottom surface which is deformable relative to the disc to follow a curvature of the respective vehicle surface and means fastening the disc to the flexible attachment member and a layer of adhesive having one surface adhesively fastened to a bottom surface of the flexible attachment member and an opposed surface covered by a removable covering layer for fastening to the respective vehicle surface.

3

This fastening arrangement has the advantage that it allows the fabric cover to form a cover for the grill of the vehicle with attachment to the front surface of a bug deflector which is attached to the vehicle above the grill and at the front of the hood.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
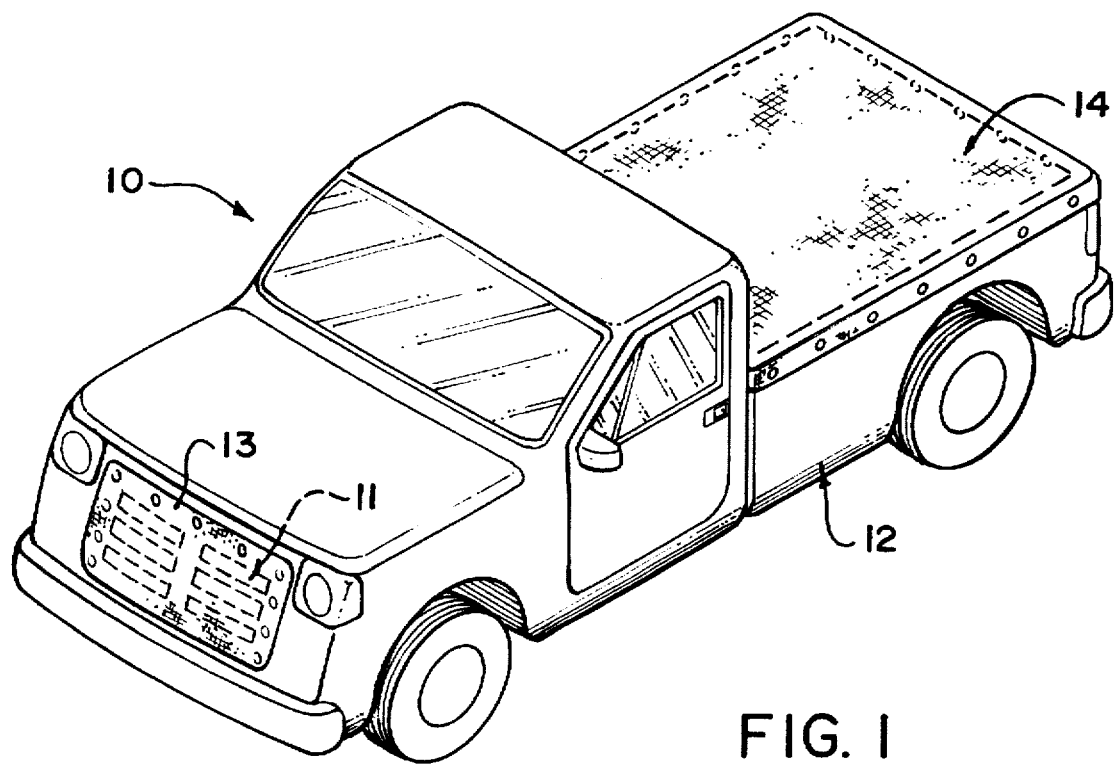
FIG. 1 is an isometric view showing simply a vehicle of the type having a vertical front grill and an open rear box with the front grill covered by a fabric cover and the box cover covered by a tonneau cover.

In FIG. 1 is a vehicle generally indicated at 10 which is of the pick-up type including a vertical front grill 11 and a rear box 12. The front grill 11 is covered by a fabric panel 13 and the box is covered by a tonneau cover 14. The vehicle is of conventional construction and shown only schematically. The covers 13 and 14 are also shown only schematically as these are well known to one skilled in the art and can vary in accordance with the requirements.

Figure 2:
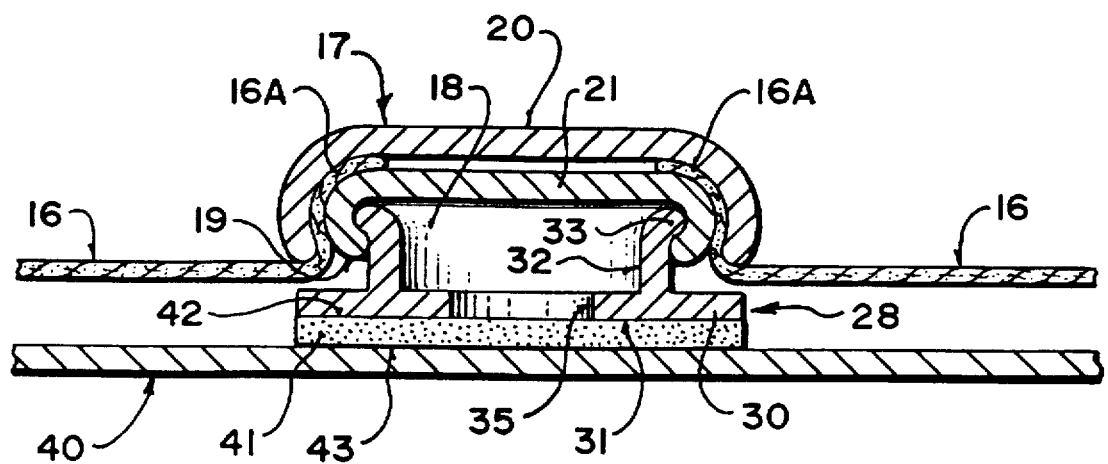
FIG. 2 is a cross sectional view showing one of the fastening elements by which the covers are fastened to the vehicle surfaces.
Figure 3:
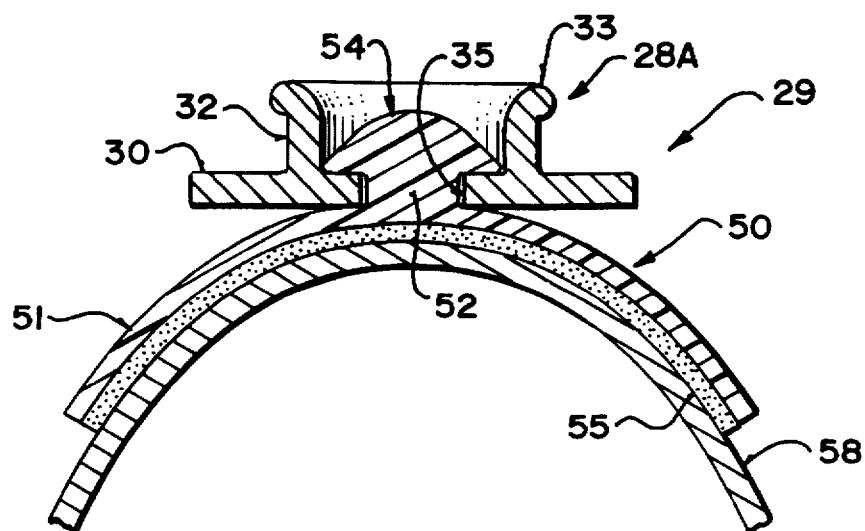
FIG. 3 is a vertical cross sectional view through a second fastening element.
Figure 4:
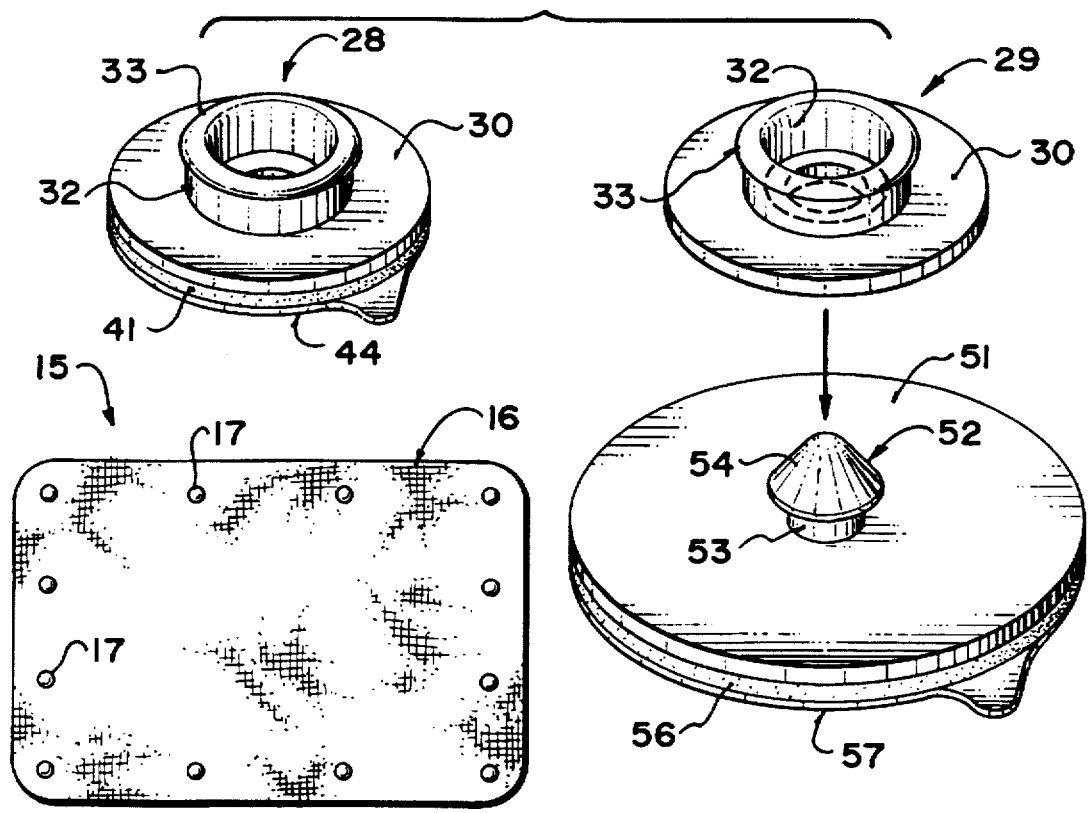
FIG. 4 shows a kit of parts which can be purchased by a user for attachment to a vehicle of the type shown in FIG. 1.

The present invention is concerned with the technique for fastening the covers 13 and 14 to the vehicle and the elements for forming this fastening technique are shown in FIGS. 2, 3 and 4.

Thus in FIG. 4 is shown one of the covers which is generally indicated at 15 comprising a fabric sheet 16 and a plurality of female cap-type fasteners 17.

Also in FIG. 4 is shown two types of male fasteners generally indicated at 28 and 29. Further details of the male fastener 28 are shown in FIG. 2 and further details of the male fastener 29 are shown in FIG. 3.

In general each of the fasteners is of the known type best shown in FIG. 2. In this type of fastening arrangement, there is provided a female cap portion 17 which defines a relatively shallow cap having a female recess 18 and a peripheral engagement rim 19 surrounding the recess 18. The fabric 16 has portions 16A clamped to the cap 17 and in the arrangement shown this effected by an outer cap section 20 which pinches the portion 16A between the outer cap section 20 and an inner cap section 21 defining the recess 18.

The female cap 17 cooperates with the male portion 28 in a snap fastening arrangement.

The male portion 28 comprises a rigid disc 30 which has a bottom circular surface 31 and an upstanding cylindrical fastening portion 32 with an engagement rim 33. The rim 19 of the cap 17 is thus arranged as a snap-fit over the rim 33 of the cylindrical portion 32.

4

The rigid circular disc 30 surrounds the cylindrical portion and projects outwardly therefrom. The disc is planar and the disc has a central hole 35.

In the arrangement shown in FIG. 2, the disc is bonded to a surface 40 of the vehicle by a layer 41 of an adhesive material. The layer 41 has an upper surface 42 adhesively bonded to the bottom surface 31 of the disc. The layer 41 has a bottom surface 43 adhesively bonded to an upper surface of the vehicle panel 40.

In the kit of parts shown in FIG. 4, the layer 41 is supplied in condition which it is covered by a sheet 44 of a non-adhesive plastics material which covers the adhesive surface 43 of the layer 41 and thus prevents inadvertent adhesion to surrounding elements.

In operation, the layer 44 is removed and the adhesive layer 41 applied to the vehicle surface to provide an adhesive bonding effect of the male portion 28 to the vehicle surface.

With the male portion so bonded in place, the fabric cover can be snap-fastened into place simply by pressing the female caps over the respective male portions in their bonded positions which is arranged in an array matching the array of female caps 17 on the fabric cover 16.

In a situation where the vehicle surface at the position where the snap fastener is to be located is flat, the male fastening portion 28 can be used since the flat disc substantially rigid and is fixedly applied onto the flat surface 40 of the vehicle.

Turning now to FIGS. 3 and 4, the male projecting member 29 is shown which includes a male portion 28A identical to the male portion 28 in that it includes the flat disc 30 having a central hole 35 and the upstanding cylindrical portion 32 with the rim 33.

However in this embodiment the underside of the disc 30 is not directly attached to the vehicle surface but instead there is provided a flexible mounting member generally indicated at 50 comprising a sheet 51 of a flexible plastics material which carries a stud member 52 generally of mushroom-shape centrally of the sheet 51. The stud 52 thus comprises a cylindrical portion 53 which stands up from an upper surface of the sheet 51 together with a head 54 which is engaged through the hole 35 and provides a fixing of the stud to the male portion 28A. The stud 52 is shaped so that it can be inserted through the hole 35 and when inserted provides a fixed condition of the male portion 28A on the coupling portion 50. This can be effected by a riveting process or simply by the shaping of the stud 52. In any event the amount of force provided by the stud 52 to hold the male portion 28A on the coupling member 50 is greater than the amount of force necessary to unfasten the snap fastening arrangement provided by the female cap.

The sheet 51 has transverse dimensions greater than that of the disc 30 so that it projects outwardly beyond the disc. The sheet 51 is relatively thin so that it is flexible with the amount of flexibility allowing it to deform as shown in FIG. 3 so that portions of the sheet underlying the disc 30 are curved away from the disc to follow the curvature of a portion 55 of the vehicle surface.

The underside of the sheet 51 is covered by a layer 56 of a adhesive which is again of the type formed by a double-sided adhesive tape and is again covered by a covering sheet 57 which can be peeled away from a bottom surface 58 of the adhesive layer to expose the adhesive bottom surface for attachment to the vehicle surface 55.

The kit of parts as shown in FIG. 4 therefore provides the cover and the two types of male fasteners. The cover itself of course carries the female parts of the snap fastening elements.

When the kit of parts is removed from suitable packaging, the user can select to use either the male portions 28 or the male portions 29 depending upon the type of surface to which the cover is to be attached.

The sheet 51 is circular or oval without corners so as to avoid when attached the presence of points or sharp corners which can be picked or abraded and thus increase the possibility of the sheet being removed from its adhesive position on the vehicle surface. In both cases the adhesive layer is coextensive with the surface to which it is applied that is the undersurface of the sheet 51 or the undersurface of the disc itself.

Figure 5:
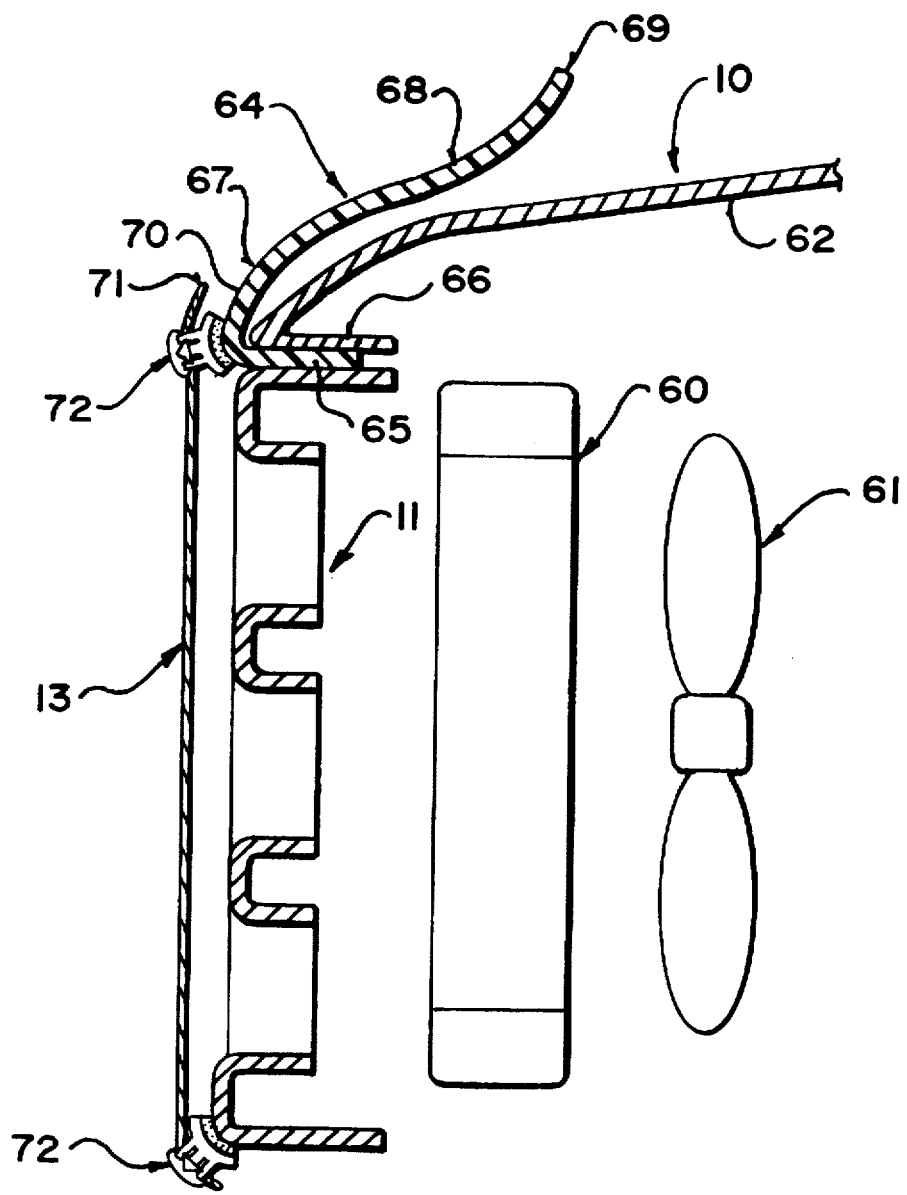
FIG. 5 is a cross-sectional view through the front of the vehicle showing the addition of a bug deflector and the attachment of the upper edge of the cover to the front surface of the deflector.

Turning now to FIG. 5, the vehicle 10 is shown in partial cross section showing a front part only of the vehicle with the grill 11 and the cover 13 mounted in front of a radiator 60 and a fan 61. The vehicle further includes a hood 62 over the engine compartment. As is well known the vehicle further includes a bug deflector 64 which is of the molded plastics type which is shaped to define a flange 65 attached to the vehicle underneath a front edge 66 of the hood with the bug deflector then extending upwardly in a first portion 67 and a rearwardly and upwardly inclined portion 68 leading to an upper edge 69 which defines an airflow pattern tending to lift the air passing over the front of the vehicle upwardly so that it does not reach the windshield. The first portion 67 of the molded deflector forms a smooth curve from the horizontal flange 65 through a vertical section and inclined rearwardly and upwardly. On the front surface 70 of the smooth curve is attached an upper edge 71 of the cover 13 by a fastener 72 of the type previously described. A similar fastener 72 is fastened to the lower part of the grill. The use of the adhesive attachment allows the cover to be attached in this manner so that the cover in effect forms an extension of the lower part of the deflector 64 and extends downwardly therefrom in the effect of a curtain thus providing a smoother and more attractive appearance for the front section of the vehicle and covering the less attractive area defined by the junction between the deflector and the vehicle body.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A vehicle comprising;

a vehicle body having at least one opening therein to be covered;

a plurality of vehicle surfaces arranged around said at least one opening;

a fabric cover for engaging over the opening and having edge portions for engaging respective ones of the vehicle surfaces;

and a plurality of fastening elements for fastening the edge portions to the respective vehicle surfaces;

each fastening element comprising:

a female cap member having portions thereof attaching the female cap member to a respective edge portion of the fabric cover and having a female receptacle;

and a male projecting member separate from the fabric cover comprising a male portion and a thin flexible mounting pad with a layer of adhesive on an exposed surface thereof;

the male portion having a rigid flat disk with a hole therein and a peripheral rim of the male portion standing upwardly from the rigid flat disk and engageable into the female receptacle of the cap member as a readily releasable and reengageable snap fastener;

the layer of adhesive having one surface adhesively fastened to the exposed surface of the flexible mounting pad and an opposed surface fastened to the respective vehicle surface;

the thin flexible pad having a stud member projecting therefrom in a direction opposite to said exposed surface and projecting into said hole in the rigid flat disk so as to fasten the rigid flat disk to the flexible attachment member;

the thin flexible pad being flexible in a direction such that edges thereof are flexible toward and away from the rigid flat disk and such that at least one of the fastening elements has the thin flexible pad thereof flexed away from the rigid flat disk thereof and is attached by said adhesive layer thereof to a surface portion of the vehicle which is arcuate.

2. The vehicle according to claim 1 wherein the thin flexible pad has transverse dimensions greater than transverse dimensions of the rigid flat disk.

* * * * *